(12) United States Patent
Sun et al.

(10) Patent No.: US 11,205,223 B2
(45) Date of Patent: Dec. 21, 2021

(54) BLOCKCHAIN-BASED SERVICE PROCESSING METHODS AND APPARATUSES

(71) Applicant: ALIPAY (HANGZHOU) INFORMATION TECHNOLOGY CO., LTD., Zhejiang (CN)

(72) Inventors: Shanlu Sun, Hangzhou (CN); Ping Dai, Hangzhou (CN); Diaolong Tang, Hangzhou (CN); Xiao Wu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,880

(22) Filed: Jun. 29, 2021

(65) Prior Publication Data
US 2021/0326977 A1    Oct. 21, 2021

(30) Foreign Application Priority Data
Sep. 21, 2020   (CN) .......................... 202010997270.X

(51) Int. Cl.
*G06Q 40/00* (2012.01)
*G06Q 40/02* (2012.01)
*H04L 9/32* (2006.01)

(52) U.S. Cl.
CPC ............ *G06Q 40/025* (2013.01); *H04L 9/32* (2013.01); *G06Q 2220/00* (2013.01)

(58) Field of Classification Search
CPC ..... G06Q 40/025; G06Q 2220/00; H04L 9/32

USPC ......................................................... 235/379
See application file for complete search history.

(56) References Cited

U.S. PATENT DOCUMENTS

2019/0019168 A1*  1/2019  Wu ..................... H04L 63/0421
2021/0240858 A1*  8/2021  Tsafack Chetsa .... H04L 9/3239

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Jamara A Franklin
(74) *Attorney, Agent, or Firm* — Fish & Richardson P.C.

(57) ABSTRACT

Disclosed herein are systems, methods, and media for processing and updating risk assessment information of a user. One of the methods here comprise: obtaining risk assessment information and digital identity of the user; creating a first verifiable claim based on the digital identity and the risk assessment information by using a first blockchain, revoking a second verifiable claim of original risk assessment information corresponding to the digital identity by using the first blockchain; uploading the first verifiable claim to a second blockchain; obtaining a storage credential of the first verifiable claim in the second blockchain, wherein the second blockchain is connected to a service processing platform; generating a risk assessment card corresponding to the user based on the storage credential and the first verifiable claim; and allowing the service processing platform to obtain the risk assessment information of the user from the second blockchain by using the risk assessment card.

20 Claims, 9 Drawing Sheets

– – – –
BLOCKCHAIN-BASED SERVICE PROCESSING METHODS AND APPARATUSES

CROSS-REFERENCE TO RELATED APPLICATIONS

This application claims priority to Chinese Patent Application No. 202010997270.X, filed on Sep. 21, 2020, which is hereby incorporated by reference in its entirety.

TECHNICAL FIELD

The present document relates to the field of blockchain technologies, and in particular, to blockchain-based service processing methods and apparatuses.

BACKGROUND

A blockchain is a new application mode of computer technologies such as distributed data storage, point-to-point transmission, a consensus mechanism, and an encryption algorithm. The blockchain is an important concept of bitcoin and is essentially a decentralized database. In a blockchain system, data blocks are connected in chronological order and combined into a blockchain-type data structure, and the blockchain system is a distributed ledger that cannot be tampered with or forged, which is guaranteed by using cryptography. Due to features of the blockchain, such as decentralization, tamper-resistance of information, autonomy, and independence, the blockchain is increasingly valued and applied.

SUMMARY

Embodiments of the present specification provide a blockchain-based service processing method. The method includes the following: obtaining new risk assessment information by repeating performing risk assessment on a target user; obtaining digital identity information corresponding to the target user; creating a first verifiable claim of the new risk assessment information corresponding to the digital identity information based on the digital identity information and the new risk assessment information by using a first blockchain, and revoking a second verifiable claim of original risk assessment information corresponding to the digital identity information by using the first blockchain; and updating content data of the first verifiable claim to a second blockchain, obtaining a storage credential of the content data of the first verifiable claim in the second blockchain, and generating a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a blockchain-based service processing method, applied to a first blockchain. The method includes the following: receiving digital identity information corresponding to a target user and new risk assessment information obtained by repeating performing risk assessment on the target user that are uploaded by an authorization management platform; creating a first verifiable claim of the new risk assessment information corresponding to the digital identity information, and revoking a second verifiable claim of original risk assessment information corresponding to the digital identity information; and returning content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a blockchain-based service processing apparatus. The apparatus includes: a first acquisition module, configured to obtain new risk assessment information obtained by repeating performing risk assessment on a target user; a second acquisition module, configured to obtain digital identity information corresponding to the target user; a first execution module, configured to create a first verifiable claim of the new risk assessment information corresponding to the digital identity information based on the digital identity information and the new risk assessment information by using a first blockchain, and revoke a second verifiable claim of original risk assessment information corresponding to the digital identity information by using the first blockchain; and a second execution module, configured to upload content data of the first verifiable claim to a second blockchain, obtain a storage credential of the content data of the first verifiable claim in the second blockchain, and generate a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a blockchain-based service processing apparatus, applied to a first blockchain. The apparatus includes: a receiving module, configured to receive digital identity information corresponding to a target user and new risk assessment information obtained by repeating performing risk assessment on the target user that are uploaded by an authorization management platform; an execution module, configured to create a first verifiable claim of the new risk assessment information corresponding to the digital identity information, and revoke a second verifiable claim of original risk assessment information corresponding to the digital identity information; and a returning module, configured to return content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a blockchain-based service processing device, including: a processor; and a memory, arranged to store computer-executable instructions. The executable instructions enable, when being executed, the processor to: obtain new risk assessment information obtained by repeating performing risk assessment on a target user; obtain digital identity information corresponding to the target user; create a first verifiable claim of the new risk assessment information corresponding to the digital identity information based on the digital identity information and the new risk assessment information by using a first blockchain, and revoke a second verifiable claim of original risk assessment information corresponding to the digital identity information by using the first blockchain; and upload content data of the first verifiable claim to a second blockchain, obtain a storage credential of the content data of the first verifiable claim in the second blockchain, and generate a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a blockchain-based service processing device, applied to a first blockchain. The device includes: a processor; and a memory, arranged to store computer-executable instructions. The executable instructions enable, when being executed, the processor to: receive digital identity information corresponding to a target user and new risk assessment information obtained by repeating performing risk assessment on the target user that are uploaded by an authorization management platform; create a first verifiable claim of the new risk assessment information corresponding to the digital identity information, and revoke a second verifiable claim of original risk assessment information corresponding to the digital identity information; and return content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a storage medium, configured to store computer-executable instructions. The executable instructions implement the following process when being executed: obtaining new risk assessment information obtained by repeating performing risk assessment on a target user; obtaining digital identity information corresponding to the target user; creating a first verifiable claim of the new risk assessment information corresponding to the digital identity information based on the digital identity information and the new risk assessment information by using a first blockchain, and revoking a second verifiable claim of original risk assessment information corresponding to the digital identity information by using the first blockchain; and uploading content data of the first verifiable claim to a second blockchain, obtaining a storage credential of the content data of the first verifiable claim in the second blockchain, and generating a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

Embodiments of the present specification further provide a storage medium, applied to a first blockchain. The storage medium is configured to store computer-executable instructions, and the executable instructions implement the following process when being executed: receiving digital identity information corresponding to a target user and new risk assessment information obtained by repeating performing risk assessment on the target user that are uploaded by an authorization management platform; creating a first verifiable claim of the new risk assessment information corresponding to the digital identity information, and revoking a second verifiable claim of original risk assessment information corresponding to the digital identity information; and returning content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim. The content data of the first verifiable claim includes the new risk assessment information. Content data of the second verifiable claim includes the original risk assessment information. The second blockchain is connected to a service processing platform, and the new risk assessment card is used by the service processing platform to obtain the new risk assessment information of the target user from the second blockchain.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description show only some embodiments of the present application, and a person of ordinary skill in the art can still derive other drawings from these accompanying drawings without creative efforts.

FIG. 3(*b*) is a schematic diagram 2 illustrating an interface for updating a risk assessment card in a blockchain-based service processing method, according to embodiments of the present specification;

FIG. 3(*c*) is a schematic diagram 3 illustrating an interface for updating a risk assessment card in a blockchain-based service processing method, according to embodiments of the present specification;

DESCRIPTION OF EMBODIMENTS

To make a person skilled in the art better understand the technical solutions in the present document, the following clearly and comprehensively describes the technical solutions in the embodiments of the present specification with reference to the accompanying drawings in the embodiments of the present specification. Clearly, the described embodiments are only some rather than all of the embodiments of the present specification. All other embodiments obtained by a person of ordinary skill in the art based on the embodiments of the present specification without creative efforts shall fall within the protection scope of the present document.

Generally, risk assessment needs to be performed on a user when the user handles a financial service by using a financial institution. For example, risk assessment needs to be performed on a user when the user purchases a financial product. The risk assessment means assessing risk tolerance of a user, so that a financial institution can provide the user with a product or service that matches the risk tolerance based on a risk assessment result of the user. When a user invests in financial institutions, the corresponding financial institutions store related information of the user, for example, risk assessment result information and basic information such as age, ID card, family status, and income. To ensure security and privacy of user information, more financial institutions start introducing blockchains to store user profile information. As time elapses, some information such as a financial habit or family income of a user may change. Therefore, some financial institutions request to repeat performing risk assessment on the use at a certain time interval, or the user proactively repeats performing risk assessment.

In either of the scenarios, new risk assessment information is generated when risk assessment is repeated for the user. Risk assessment information of the user previously stored in a blockchain needs to be updated, and it needs to be ensured that a service processing platform can obtain the updated risk assessment information accurately and effectively and adjust a product or service provided with the user in time.

Based on this need, the embodiments of the present specification provide a blockchain-based service processing method, apparatus, device, and a storage medium.

Figure 1:
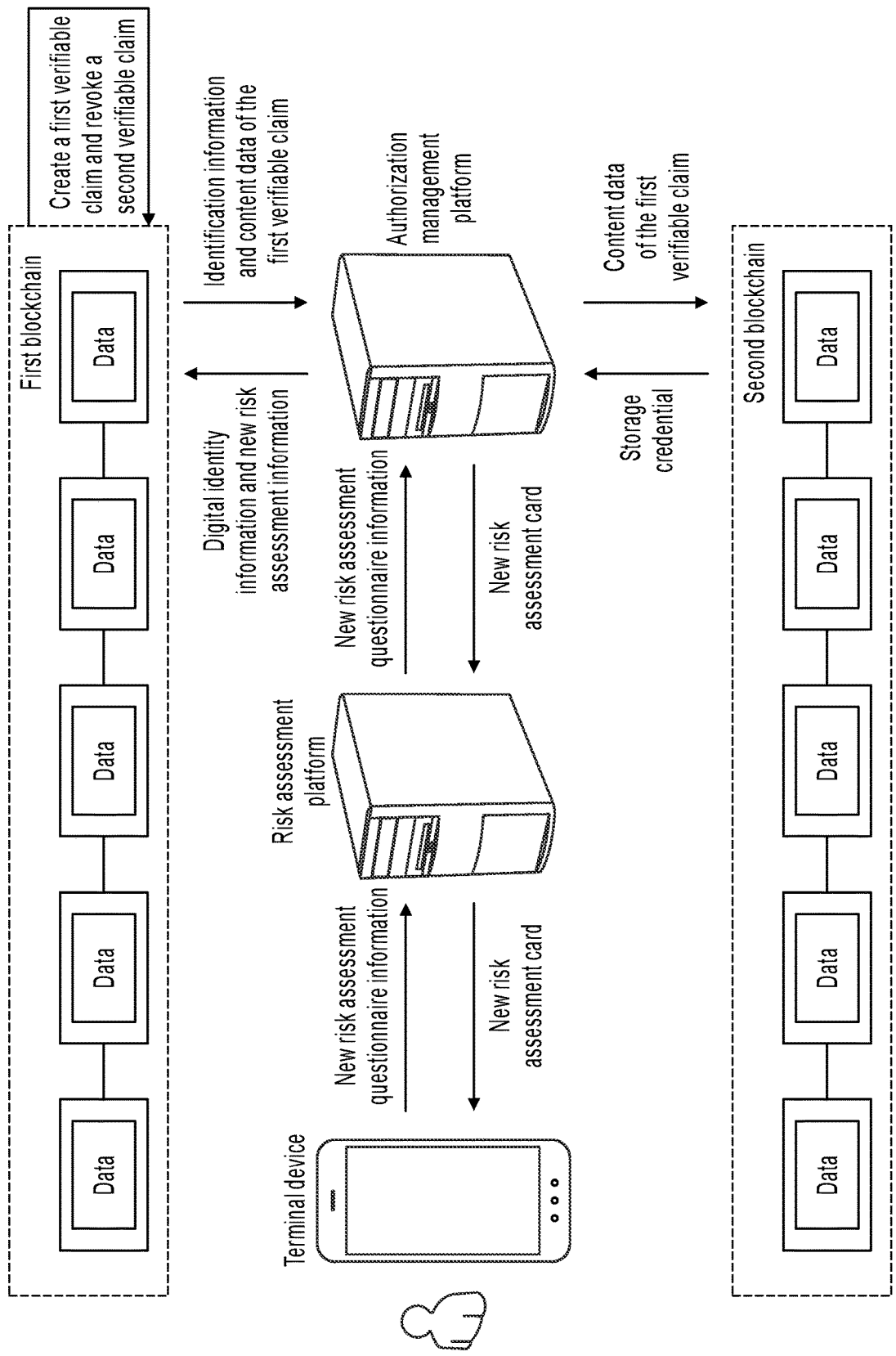
FIG. 1 is a schematic diagram illustrating an application scenario of a blockchain-based service processing method, according to embodiments of the present specification.

FIG. 1 is a schematic diagram illustrating an application scenario of a blockchain-based service processing method, according to embodiments of the present specification. As shown in FIG. 1, the application scenario includes a terminal device, a risk assessment platform, an authorization management platform, a first blockchain, and a second blockchain. The terminal device can be a device such as a mobile phone, a tablet computer, or a computer. In the scenario shown in FIG. 1, the terminal device is a mobile phone in this exemplary description, without constituting a limitation on the embodiments of the present specification. A service client device corresponding to the risk assessment platform is installed in the terminal device. The service client device can be an independent application (APP) installed in the terminal device, can be an applet embedded in some independent applications, or can be a web page, etc. The risk assessment platform can be an applet or a function module in a service processing platform connected to the second blockchain, or can be a platform independent of the service processing platform and independently used to perform risk assessment.

Specifically, when risk assessment needs to be repeated for a user, risk assessment can be repeated for the user by using the service client device. The service client device uploads risk assessment questionnaire information currently filled in by the user to the risk assessment platform. The risk assessment platform generates new risk assessment information based on the risk assessment questionnaire information of the user. The risk assessment information can include a risk assessment result, user identification information of the user that risk assessment is performed on, information about an account logged into by the user on the risk assessment platform during risk assessment, service serial number information corresponding to the current risk assessment, risk assessment number information, etc. The risk assessment platform sends the generated new risk assessment information to the authorization management platform. The authorization management platform obtains digital identity information of the user, where the digital identity information can be, for example, a decentralized identity (DID), and uploads the digital identity information of the user and the new risk assessment information to the first blockchain, to create a first verifiable claim (VC) of the new risk assessment information corresponding to the digital identity information by using the first blockchain. Content data of the created first verifiable claim includes the new risk assessment information. Risk assessment has been previously performed on the user once. Therefore, to enable the user to execute a related risk service by using the new risk assessment information, that is, to enable risk assessment information corresponding to the user to point to the new risk assessment information, a second verifiable claim of original risk assessment information corresponding to the digital identity information further needs to be revoked by using the first blockchain. As such, content data of the second verifiable claim is invalidated. The content data of the second verifiable claim includes the original risk assessment information. The first blockchain returns the created first verifiable claim to the authorization management platform, uploads the content data of the first verifiable claim to the second blockchain for storage, and obtains a storage credential returned by the second blockchain by using the authorization management platform. The authorization management platform generates a new risk assessment card based on the storage credential and the first verifiable claim, returns the new risk assessment card to the risk assessment platform, and returns the new risk assessment card to the target user by using the risk assessment platform. The generated new risk assessment card is used by the service processing platform connected to the second blockchain to obtain the new risk assessment information (i.e., the content data of the first verifiable claim) stored in the second blockchain from the second blockchain. Optionally, when obtaining the new risk assessment information, the service processing platform can first search the authorization management platform for the storage credential corresponding to the first verifiable claim based on the first verifiable claim in the new risk assessment card, and then obtain the content data (i.e., the new risk assessment information) of the first verifiable claim from the second blockchain based on the storage credential. The storage credential of the content data of the first verifiable claim in the second blockchain can be a hash value.

Certainly, the previously described scenario is described by using an example that the first blockchain creates the first verifiable claim. However, the first verifiable claim can be created on the authorization management platform or created by other authority institutions. Implementations are not listed one by one in the embodiments of the present specification.

In addition, it is worthwhile to note that the above lists only one specific implementation of repeating performing risk assessment on the user by using a risk assessment client device and updating a risk assessment card. In addition, the user can request to update the risk assessment card (or request re-assessment) by using an authorization management client device, and then switch to the risk assessment platform for risk re-assessment. Alternatively, the user can directly request to update the risk assessment card (or request re-assessment) by using the authorization management client device, and then the authorization management platform performs risk assessment on the user. Only a few possible specific implementations of repeating performing risk assessment on the user are listed here. Certainly, the user can request risk re-assessment by using other methods. The methods are not listed one by one in the embodiments of the present specification.

Optionally, in a specific implementation, if the user requests risk re-assessment by using the authorization management client device, the authorization management client device can obtain test questionnaire information needed for assessment from the risk assessment platform. The user fills in the test questionnaire information in the authorization management client device, and then the authorization management platform generates new risk assessment information based on the test questionnaire information filled in by the user. In this case, the authorization management platform directly generates the new risk assessment information. After generating the new risk assessment information of the target user, the authorization management platform obtains the digital identity information corresponding to the target user, creates the first verifiable claim of the new risk assessment information corresponding to the digital identity information based on the digital identity information and the new risk assessment information by using the first blockchain, and revokes the second verifiable claim of the original risk assessment information corresponding to the digital identity information by using the first blockchain. The authorization management platform uploads the content data of the created first verifiable claim to the second blockchain, obtains the storage credential of the content data of the first verifiable claim in the second blockchain, and generates the new risk assessment card corresponding to the target user based on the storage credential and the first verifiable claim. The second blockchain can be connected to one or more service processing platforms, and the new risk assessment card is used by the one or more service processing platforms to obtain the new risk assessment information of the target user from the second blockchain. In this case, the authorization management platform returns the generated new risk assessment card to the authorization management client device.

Figure 2:
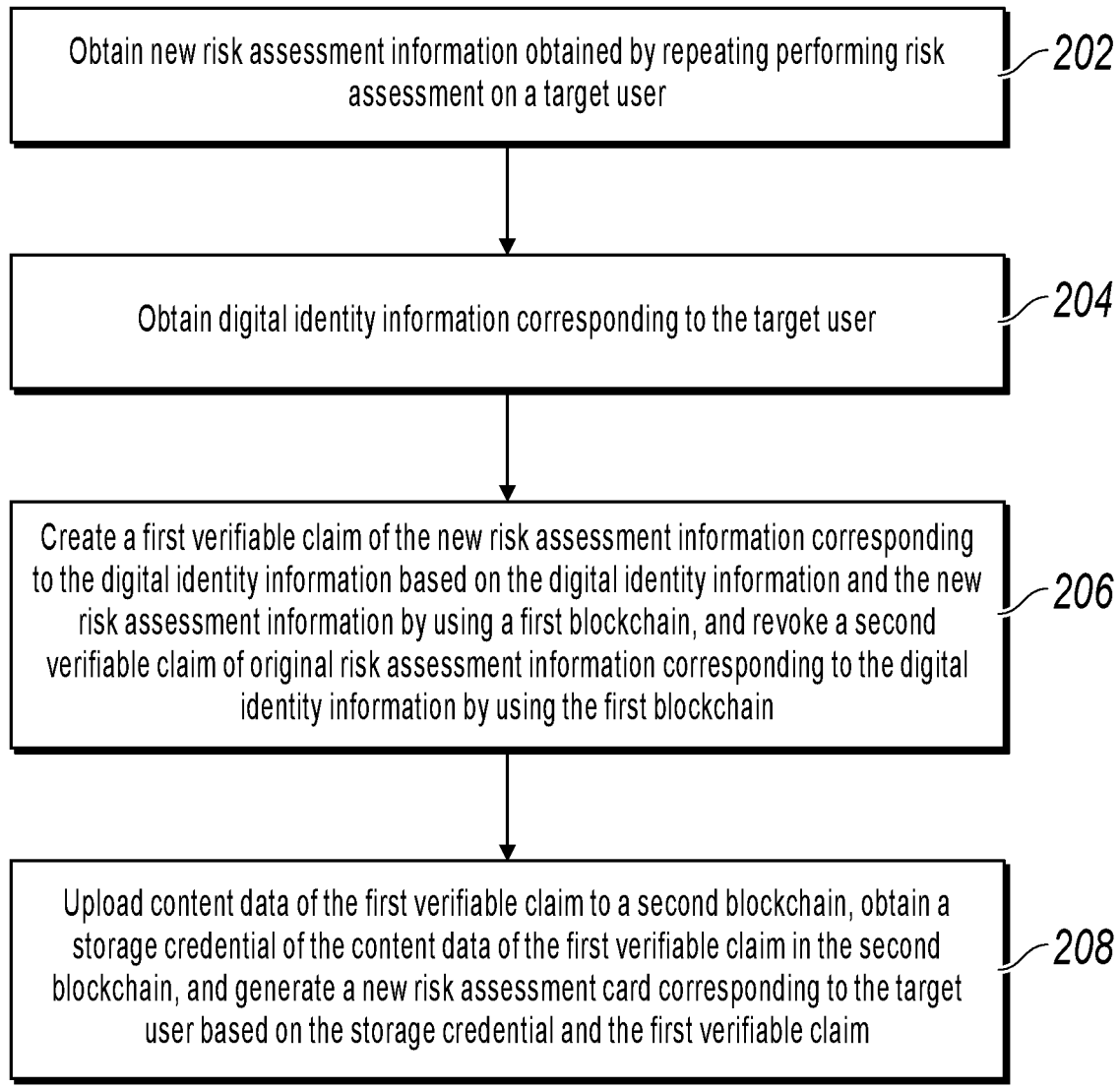
FIG. 2 is a first method flowchart illustrating a blockchain-based service processing method, according to embodiments of the present specification.

FIG. 2 is a first flowchart illustrating a blockchain-based service processing method, according to embodiments of the present specification. The method shown in FIG. 2 is applied to an authorization management platform, that is, the method is performed by the authorization management platform. Specifically, the method can be performed by a blockchain-based service processing apparatus installed in the authorization management platform. As shown in FIG. 2, the method includes at least the following steps.

Step 202: Obtain new risk assessment information obtained by repeating performing risk assessment on a target user.

Optionally, in a specific implementation, the new risk assessment information includes at least a new risk assessment result, such as conservative or robust. Specifically, risk assessment can be repeated for the user by using a risk assessment platform. Correspondingly, in step 202, the new risk assessment information is obtained from the risk assessment platform. Correspondingly, in addition to the new risk assessment result, the new risk assessment information can further include any one or more of user identification information of the target user on the risk assessment platform, information of an account logged into by the target user on the risk assessment platform during new risk assessment, risk assessment number information of the new risk assessment performed on the target user, a service serial number of the new risk assessment performed on the target user, time information of the new risk assessment performed on the target user, identification information of the risk assessment platform that performs the new risk assessment on the user, etc. Certainly, in addition to the listed content, content included in the new risk assessment information can further include other content. The above lists only several possible types of information as examples, without constituting a limitation on the embodiments of the present specification.

It is worthwhile to note that, the risk assessment result in the new risk assessment information obtained when risk assessment is repeated for the user can be the same as an original risk assessment result (for example, both are conservative), or can be different from the original risk assessment result (for example, the original risk assessment result is conservative, and the new risk assessment result is robust). Whether the risk assessment result in the new risk assessment information is the same as the original risk assessment result is not limited in the embodiments of the present specification. As long as risk assessment is repeated for the user, a new risk assessment card is generated by using the method provided in the embodiments of the present specification.

Step 204: Obtain digital identity information corresponding to the target user.

Optionally, during specific implementation, after obtaining the risk assessment information obtained by repeating performing risk assessment on the target user, the authorization management platform performs the operation of obtaining the digital identity information corresponding to the target user.

The digital identity information can have multiple representations, and one possible representation can be a DID.

Step 206: Create a first verifiable claim of the new risk assessment information corresponding to the digital identity information based on the digital identity information and the new risk assessment information by using a first blockchain, and revoke a second verifiable claim of original risk assessment information corresponding to the digital identity information by using the first blockchain.

Content data of the first verifiable claim includes the new risk assessment information. Content data of the second verifiable claim includes the original risk assessment information.

Optionally, in the embodiments of the present specification, the content data of the first verifiable claim can also be understood as content claimed in the first verifiable claim. The first verifiable claim is used to claim the new risk assessment information corresponding to the digital identity information. The content data of the second verifiable claim can also be understood as content claimed in the second verifiable claim. The second verifiable claim is used to claim the original risk assessment information corresponding to the digital identity information.

Optionally, in step 206, the creating a first verifiable claim includes at least two specific implementations: performing the operation of creating the first verifiable claim in the first blockchain or performing the operation of creating the first verifiable claim on the authorization management platform. Identification information and the content data of the first verifiable claim need to be generated regardless of whether the first verifiable claim is created in the first blockchain or the first verifiable claim is created on the authorization management platform.

Specifically, in the embodiments of the present specification, in addition to including the risk assessment information (i.e., claiming the risk assessment information), the content data of the first verifiable claim can further include any one or more types of the following information: the number information of the new risk assessment information, the digital identity information of the target user, digital identity information of the risk assessment platform that repeats performing risk assessment, and generation time information of the new risk assessment information.

Optionally, in a specific implementation, risk assessment may be performed on the target user for multiple times. Correspondingly, risk assessment information pointed to by a risk assessment card needs to be updated as risk assessment is repeated for the target user. In the embodiments of the present specification, during specific implementation, the content data (including the risk assessment information) of the created first verifiable claim is written to a second blockchain for storage. Because the risk assessment information written to the second blockchain cannot be deleted or modified, after new risk assessment information is generated, the risk assessment information cannot be updated by modifying the data in the second blockchain. Therefore, in the embodiments of the present specification, the original risk assessment information is invalidated by revoking the second verifiable claim of the original risk assessment information corresponding to the digital identity information by using the first blockchain, to enable risk assessment information of the target user to point to the new risk assessment information.

The first blockchain can be a DID blockchain.

Step 208: Upload the content data of the first verifiable claim to the second blockchain, obtain a storage credential of the content data of the first verifiable claim in the second blockchain, and generate a new risk assessment card corresponding to the target user based on the storage credential and the first verifiable claim.

The second blockchain is connected to a service processing platform, and the new risk assessment card is used by the service processing platform to obtain the new risk assessment information of the target user from the second blockchain.

Optionally, in the embodiments of the present specification, one or more service processing platforms can be connected to the second blockchain. Implementations are not limited in the embodiments of the present specification.

Optionally, in a specific implementation, the second blockchain can be a consortium chain, and correspondingly the service processing platform connected to the second blockchain is a member of the consortium chain.

Specifically, the authorization management platform uploads the content data of the first verifiable claim to the second blockchain for storage. After receiving the content data of the first verifiable claim uploaded by the authorization management platform, the second blockchain returns the storage credential of the content data of the first verifiable claim in the second blockchain to the authorization management platform. The storage credential can be a hash value. The authorization management platform generates the new risk assessment card corresponding to the target user based on the storage credential and the first verifiable claim. As such, the service processing platform can access the content data of the first verifiable claim from the second blockchain by using the risk assessment card, that is, obtain the risk assessment information from the second blockchain. It is worthwhile to note that, the risk assessment card in the embodiments of the present specification can be actually understood as a credential used to obtain the data from the second blockchain.

Optionally, in a specific implementation, the authorization management platform can use the credential data together with the first verifiable claim as content data of the new risk assessment card. Actually, the new risk assessment card in the embodiments of the present specification is a credential used by the user to obtain the content data of the first verifiable claim from the second blockchain. Therefore, the content data of the new risk assessment card can include only the storage credential and the identification information of the first verifiable claim, can include only the storage credential and status information of the first verifiable claim, can include only the storage credential and the risk assessment number information in the content data of the first verifiable claim, or can include both the storage credential and one piece of information in the status information, the identification information, and the content data of the first verifiable claim. Certainly, the content data of the new risk assessment card can alternatively include other content provided that the content data of the new risk assessment card includes a related credential that can be used to obtain the content data of the first verifiable claim from the second blockchain. Specific content of the new risk assessment card is not limited in the embodiments of the present specification.

In a specific implementation, the new risk assessment card can include only the storage credential, or can include only the identification information of the first verifiable claim. In this case, the storage credential is stored in the authorization management platform. When the new risk assessment information of the target user needs to be obtained, the authorization management platform is first searched for the storage credential corresponding to the first verifiable claim based on the identification information of the first verifiable claim, and the second blockchain is searched for the content data of the first verifiable claim based on the storage credential, to obtain the new risk assessment information of the target user. That is, in the embodiments of the present specification, the new risk assessment card can be generated based on only the first verifiable claim, can be generated based on only the storage credential, or can be generated based on both the first verifiable claim and the storage credential. Implementations are not limited in the embodiments of the present specification.

Certainly, the embodiments of the present specification list only several possible implementations as examples, without constituting a limitation on the embodiments of the present specification.

According to the blockchain-based service processing method provided in the embodiments of the present specification, after the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

To facilitate understanding of the method provided in the embodiments of the present specification, the following describes in detail specific implementation processes of the previously described steps.

Optionally, in a specific implementation, in step 202, the new risk assessment information obtained by repeating performing risk assessment on the target user can be obtained by using at least the following method.

A risk assessment card updating request sent by the target user is received, and the new risk assessment information obtained by repeating performing risk assessment on the target user is obtained based on the request.

That is, in a specific implementation, the user can enter the authorization management platform by using an authorization management client device, to send the request for updating the risk assessment card to the authorization management platform. In this case, the authorization management platform instructs to repeat performing the risk assessment operation on the user, to generate the new risk assessment information.

Alternatively, update information of the risk assessment information of the target user sent by the risk assessment platform is received, where the update information includes the new risk assessment information obtained by repeating performing risk assessment on the target user.

Specifically, the risk assessment operation can be repeated for the user by using a risk assessment client device. As such, after the update information of the risk assessment information of the target user is generated on the risk assessment platform, the update information is sent to the authorization management platform. For example, in a specific implementation, the update information can be that risk assessment is repeated for user A on the risk assessment platform at XX time, and the risk assessment information is XXX.

Certainly, the embodiments of the present specification list only the specific implementations of repeating performing risk assessment on the target user, without constituting a limitation on the embodiments of the present specification.

Optionally, in a specific implementation, in step 206, the revoking a second verifiable claim of original risk assessment information corresponding to the digital identity information by using the first blockchain specifically includes: modifying status information representing whether the content data of the second verifiable claim is valid to an invalid state, and marking status information representing whether the content data of the first verifiable claim is valid to a valid state by using the first blockchain.

Specifically, in the embodiments of the present specification, mapping relationships between verifiable claim identification information and corresponding status information are stored in the first blockchain. After a verifiable claim of risk assessment information corresponding to digital identity information is created, status information of the verifiable claim is marked as a valid state, to represent that content data of the verifiable claim is valid and can be normally used. After a verifiable claim of new risk assessment information corresponding to the digital identity information is created, the status information of the verifiable claim of the original risk assessment information corresponding to the digital identity information needs to be modified to an invalid state, to represent that the content data of the verifiable claim is invalid, that is, is in an unavailable state.

For a user with digital identity information, risk assessment may be performed on the user for multiple times. Therefore, one verifiable claim is created each time risk assessment information is generated. Therefore, identification information of multiple verifiable claims corresponding to the digital identity information and status information of identification information of each verifiable claim are maintained in the first blockchain. To distinguish between multiple verifiable claims corresponding to the same digital identity information, in the embodiments of the present specification, a newly created verifiable claim is denoted as a first verifiable claim, and an original verifiable claim is denoted as a second verifiable claim. Therefore, possible mapping relationships among digital identity information, verifiable claim identification information, and status information maintained in the first blockchain are shown in Table 1.

TABLE 1

| Digital identity information | Verifiable claim identification information | Status information |
|---|---|---|
| Digital identity information 1 | Verifiable claim A | Valid state |
| | Verifiable claim B | Invalid state |
| | Verifiable claim C | Invalid state |
| Digital identity information 2 | Verifiable claim 1 | Valid state |
| | Verifiable claim 2 | Invalid state |

As shown in Table 1, for digital identity information 1, verifiable claim C is created for risk assessment information of the first risk assessment on a user corresponding to digital identity information 1, and verifiable claim B is created for risk assessment information of the second risk assessment on the user corresponding to digital identity information 1. When verifiable claim C is created, status information corresponding to verifiable claim C is marked as a valid state. When verifiable claim B is created, the state corresponding to verifiable claim C is modified to an invalid state, and a state corresponding to verifiable claim B is marked as a valid state. Similarly, when the risk assessment is performed for the third time on the user corresponding to digital identity information 1, verifiable claim A is created for risk assessment information obtained after the third risk assessment. In this case, status information of newly created verifiable claim A is marked as a valid state, and status information of verifiable claim B is modified to an invalid state.

Therefore, it can be actually understood that, according to the method provided in the embodiments of the present specification, each time a new verifiable claim is created, status information of an original verifiable claim corresponding to the same digital identity information needs to be modified to an invalid state, to invalidate content data of the original verifiable claim. That is, only content data of the newly created verifiable claim is valid.

Therefore, in the embodiments of the present specification, verifiable claim status information is maintained, that is, corresponding relationships between verifiable claim identification information and corresponding status information are stored in the first blockchain, so that content data of verifiable claims pointed to by the verifiable claim identification information can be validated or invalidated. As such, even though content data of a verifiable claim stored in the second blockchain cannot be deleted or modified, status information corresponding to the corresponding verifiable claim identification information in the first blockchain can be modified to an invalid state, to invalidate the content data of the verifiable claim, thereby invalidating the content data of the corresponding verifiable claim in the second blockchain. For example, if status information corresponding to a verifiable claim with identification information A is modified to an invalid state, content data of the verifiable claim pointed to by A is invalidated.

It is worthwhile to note that, in the embodiments of the present specification, because mapping relationships between verifiable claim identifiers and status information are maintained in the first blockchain, status information of a verifiable claim corresponding to digital identity information can be queried in the first blockchain, to enable the verifiable claim corresponding to the digital identity information to point to the latest created verifiable claim, that is, to enable risk assessment information corresponding to the digital identity information to point to the latest risk assessment information, thereby updating the risk assessment information of the user.

According to the method provided in the embodiments of the present specification, the mapping relationships between verifiable claim identification information and status information are maintained in the first blockchain, and the status information corresponding to identification information of the original verifiable claim in the first blockchain is modified when the risk assessment information of the target user is updated, to invalidate the content data of the verifiable claim pointed to by the identification information. Therefore, based on the maintenance of the status information, the verifiable claim corresponding to the digital identity information is enabled to point to the latest created verifiable claim, that is, the risk assessment information corresponding to the digital identity information is enabled to point to the latest risk assessment information, thereby updating the risk assessment information of the user. That is, it can be understood that, the mapping relationships between verifiable claim identification information and status information are maintained in the first blockchain, so that verifiable claim revocation can be implemented, thereby updating the risk assessment information of the user.

Optionally, in a specific implementation, the new risk assessment information includes the risk assessment number information, the risk assessment number information is the same as risk assessment number information corresponding to the original risk assessment information.

Correspondingly, after step 208 of generating the new risk assessment card corresponding to the target user based on the storage credential and the first verifiable claim, the method provided in the embodiments of the present specification further includes the following: associating the risk assessment number information with the new risk assessment card.

Generally, after the risk assessment card used to obtain the risk assessment information from the second blockchain is generated, the risk assessment card can be associated with the risk assessment number information, to use the risk assessment number information as unique number information corresponding to the risk assessment card. In addition, the risk assessment number information is displayed on a card displayed to the user. As such, when the obtained card is used, the corresponding risk assessment card can be queried based on the risk assessment number information, to obtain the corresponding data from the second blockchain.

In addition, it is worthwhile to note that, in the embodiments of the present specification, when risk assessment is repeated for the user, the risk assessment number information issued by the risk assessment platform to the user does not change, but the risk assessment card associated with the risk assessment number information is updated.

Specifically, in the embodiments of the present specification, the risk assessment number information is generated by the risk assessment platform. However, when sending the risk assessment information to the authorization management platform, the risk assessment center adds the risk assessment number information to the risk assessment information. Therefore, the risk assessment number information can be associated with the new risk assessment card by using the authorization management platform. Certainly, the authorization management platform can alternatively send the generated risk assessment card to the risk assessment center, and the risk assessment center associates the risk assessment card with the risk assessment number information.

Optionally, in a specific implementation, the obtaining digital identity information corresponding to the target user in step 204 can specifically include: searching pre-generated digital identity information corresponding to users for the digital identity information corresponding to the target user.

The digital identity information is created based on user identification information corresponding to the user on the risk assessment platform that performs risk assessment or information about an account logged into by the user when the risk assessment platform performs risk assessment.

When risk assessment is repeated for the user and the new risk assessment card is generated, it indicates that the user has previously executed a service on the authorization management platform, that is, the digital identity information corresponding to the target user has been created. Therefore, the various pieces of digital identity information stored in the authorization management platform can be directly searched for the digital identity information corresponding to the target user.

Optionally, during specific implementation, the authorization management platform can create the digital identity information of the target user based on the user identification information corresponding to the user on the risk assessment platform that performs risk assessment, or can create the digital identity information corresponding to the target user based on the information about the account logged into by the user on the risk assessment platform. Specifically, the authorization management platform can obtain the previously described information of the users from the risk assessment platform, and create the digital identity information of the users based on the obtained information and store the digital identity information.

In addition, it is worthwhile to note that, for the same user, the user may register multiple accounts on the risk assessment platform. Therefore, when the digital identity information is created based on account information of the target user on the risk assessment platform, the digital identity information can be created based on the information about the account logged into by the user on the risk assessment platform for risk assessment. For example, if the target user logs into account A on the risk assessment platform for risk assessment, after receiving the risk assessment information of the target user sent by the risk assessment platform, the authorization management platform creates the digital identity information of the target user based on account A.

In the embodiments of the present specification, after the digital identity information corresponding to the target user is obtained, the operation of creating the first verifiable claim of the new risk assessment information corresponding to the digital identity information of the target user needs to be performed based on the digital identity information of the target user and the new risk assessment information, that is, step 206 needs to be performed.

Specifically, in the embodiments of the present specification, in step 206, the creating a first verifiable claim of the new risk assessment information corresponding to the digital identity information based on the digital identity information and the new risk assessment information by using a first blockchain includes at least the following two cases: One case is creating the first verifiable claim in the first blockchain, and the another case is creating the first verifiable claim on the authorization management platform. The following separately describes specific implementation processes of the two cases in detail.

First Case:

The digital identity information and the new risk assessment information are sent to the first blockchain, to create the first verifiable claim based on the digital identity information and the new risk assessment information by using the first blockchain; and the identification information of the first verifiable claim and the content data of the first verifiable claim are obtained from the first blockchain.

Optionally, in a specific implementation, the authorization management platform can send a creation request of the first verifiable claim to the first blockchain. The creation request includes the digital identity information of the target user and the new risk assessment information. After receiving the creation request sent by the authorization management platform, the first blockchain creates the first verifiable claim based on the digital identity information and the new risk assessment information in the creation request. The created first verifiable claim is used to claim the new risk assessment information corresponding to the digital identity information. After creating the first verifiable claim, the first blockchain returns the first verifiable claim to the authorization management platform. Specifically, the first blockchain can return the identification information and the content data of the first verifiable claim to the authorization management platform. After receiving the identification information and the content data of the first verifiable claim returned by the first blockchain, the authorization management platform uploads the content data of the first verifiable claim to the second blockchain. In addition, after creating the first verifiable claim, the first blockchain records the status information of the created first verifiable claim as a valid state, and modifies the status information of the second verifiable claim corresponding to the digital identity information to an invalid state.

Specifically, the first blockchain is used to maintain only the identification information of the first verifiable claim and the corresponding status information, and is not responsible for storing the content data of the first verifiable claim. Therefore, in a specific implementation, a mapping relationship between the identification information of the first verifiable claim and the status information corresponding to the identification information of the first verifiable claim is stored in the first blockchain.

In addition, it is worthwhile to note that, in addition to the risk assessment result of the target user, the risk assessment information can further include any one or more types of the following information: the number information of the risk assessment information, the digital identity information of the risk assessment platform that repeats performing risk assessment, the service serial number of the risk assessment, the identification information of the target user on the risk assessment platform, the account information used by the target user for risk re-assessment, the generation time information of the risk assessment information, etc.

Second Case:

The first verifiable claim is created based on the digital identity information and the new risk assessment information, and the identification information of the first verifiable claim is written to the first blockchain.

Optionally, in a specific implementation, after obtaining the digital identity information corresponding to the target user, the authorization management platform creates the first verifiable claim of the new risk assessment information corresponding to the digital identity information based on the digital identity information corresponding to the target user and the new risk assessment information. The created first verifiable claim is used to claim the new risk assessment information corresponding to the digital identity information. Specifically, the created first verifiable claim includes the identification information of the first verifiable claim and the content data of the first verifiable claim. After creating the first verifiable claim, the authorization management platform writes the identification information of the first verifiable claim to the first blockchain. After receiving the identification information of the first verifiable claim, the first blockchain sets the status information used to represent whether the content data of the first verifiable claim is valid to a valid state and stores a mapping relationship between the identification information of the first verifiable claim and the status information of the first verifiable claim; and modifies the status information representing whether the content data of the second verifiable claim is valid to an invalid state and stores a mapping relationship between the identification information of the second verifiable claim and the status information of the second verifiable claim. In addition, the first blockchain is only responsible for storing the mapping relationships between verifiable claim identification information and verifiable claim status information, and is not responsible for storing verifiable claim content data. Therefore, in the embodiments of the present specification, after creating the first verifiable claim, the authorization management platform writes the content data of the first verifiable claim to the second blockchain.

Specifically, in the embodiments of the present specification, after the first verifiable claim is created, the content data of the first verifiable claim needs to be uploaded to the second blockchain. That is, step 208 needs to be performed. In the embodiments of the present specification, to further ensure security and privacy of user data, the content data of the first verifiable claim can be encrypted before being uploaded to the second blockchain. Therefore, in a specific implementation, the uploading the content data of the first verifiable claim to the second blockchain in step 208 specifically includes the following process.

The content data of the first verifiable claim is encrypted based on a public key corresponding to the digital identity information, to obtain ciphertext information corresponding to the content data of the first verifiable claim; and the ciphertext information is uploaded to the second blockchain.

Optionally, in a specific implementation, the public key corresponding to the digital identity information can be obtained from the first blockchain based on the digital identity information corresponding to the target user, and then the content data of the first verifiable claim can be encrypted by using the public key obtained from the first blockchain.

In the embodiments of the present specification, the content data of the first verifiable claim is encrypted by using the public key of the digital identity information corresponding to the target user, and correspondingly the ciphertext information can be decrypted only by using a private key corresponding to the digital identity information, and the private key is generally held by the user with the digital identity information. Therefore, security and privacy of the content data of the first verifiable claim can be further ensured.

Specifically, in the embodiments of the present specification, after the content data of the first verifiable claim is uploaded to the second blockchain, the second blockchain generates the storage credential (such as a hash value) corresponding to the content data of the first verifiable claim, and the authorization management platform obtains the storage credential from the second blockchain and stores the storage credential. In addition, the authorization management platform generates the new risk assessment card corresponding to the risk assessment information of the target user based on the storage credential and the verifiable claim. Specifically, the new risk assessment card can include the identification information of the first verifiable claim and the credential data, can include the identification information of the first verifiable claim, the status information of the first verifiable claim, and the credential data, can include only the identification information of the first verifiable claim, or can include the identification information of the first verifiable claim and the new risk assessment result (such as robust or conservative). Here lists only a few types of content as examples, without constituting a limitation on the embodiments of the present specification.

Optionally, in a specific implementation, to prevent one user from performing risk-related services (for example, purchasing financial products) on different service processing platforms, risk assessment needs to be performed on the user repeatedly. The target user can authorize, by using the authorization management platform, the service processing platform connected to the blockchain to obtain the risk assessment information of the target user from the second blockchain.

Specifically, in the embodiments of the present specification, when the user updates the risk assessment information, although the risk assessment information is updated, the service processing platform authorized before the updating can still obtain the risk assessment information of the target user from the second blockchain by using the updated risk assessment card. That is, after the risk assessment information is updated, the previously authorized service processing platform still has permission to obtain new risk assessment information from the second blockchain. Certainly, after updating the risk assessment information, the user can continue to perform the operation of authorizing a new service processing platform based on the existing authorized service platform.

Therefore, the method provided in the embodiments of the present specification further includes the following process.

An authorization request sent by the target user is received, and a third verifiable claim is created based on the authorization request, where the authorization request is used to request to grant the service processing platform permission to obtain new risk assessment information of the target user, and the third verifiable claim is used to claim that the service processing platform is granted permission to obtain the new risk assessment information of the target user.

The authorization request can be triggered by the target user by using the authorization management client device, or can be sent by the target user to the risk assessment platform by using a service client device and then sent by the risk assessment platform to the authorization management platform for authorization.

Optionally, in a specific implementation, the authorization request includes a list of service processing platforms (which can include one service processing platform or can include multiple service processing platforms) that need to be authorized and information about permission that needs to be granted. Correspondingly, the second verifiable claim is generated based on the list of service processing platforms and the information about the permission that needs to be granted.

The service processing platform is one or several of service processing platforms connected to the second blockchain.

Optionally, in a specific implementation, after the card is issued to the target user, prompt information "whether to authorize the organization to use" can be displayed on the authorization management client device. If the user taps a button "yes" or "authorize now," an authorization page is entered. On this page, the user can select a service processing platform that the user wants to authorize. It is worthwhile to note that service processing platforms displayed on the authorization page are service processing platforms connected to the second blockchain. When selecting the service processing platform that the user wants to authorize, the user sends an authorization request for authorizing the selected service processing platform to use the risk assessment card to the authorization management platform.

After receiving the authorization request, the authorization management platform creates the third verifiable claim for the authorization request. Specifically, a specific creation process of the third verifiable claim can be performed on the authorization management platform, can be performed in the first blockchain, or can be performed in another authority. Implementations are not limited in the embodiments of the present specification.

Specifically, after the third verifiable claim is created, the method provided in the embodiments of the present specification further includes the following: encrypting the third verifiable claim based on the public key corresponding to the digital identity information, to obtain ciphertext information corresponding to the third verifiable claim; and uploading the ciphertext information corresponding to the third verifiable claim to the second blockchain, where the public key corresponding to the digital identity information can be obtained from the first blockchain.

Figure 3A:
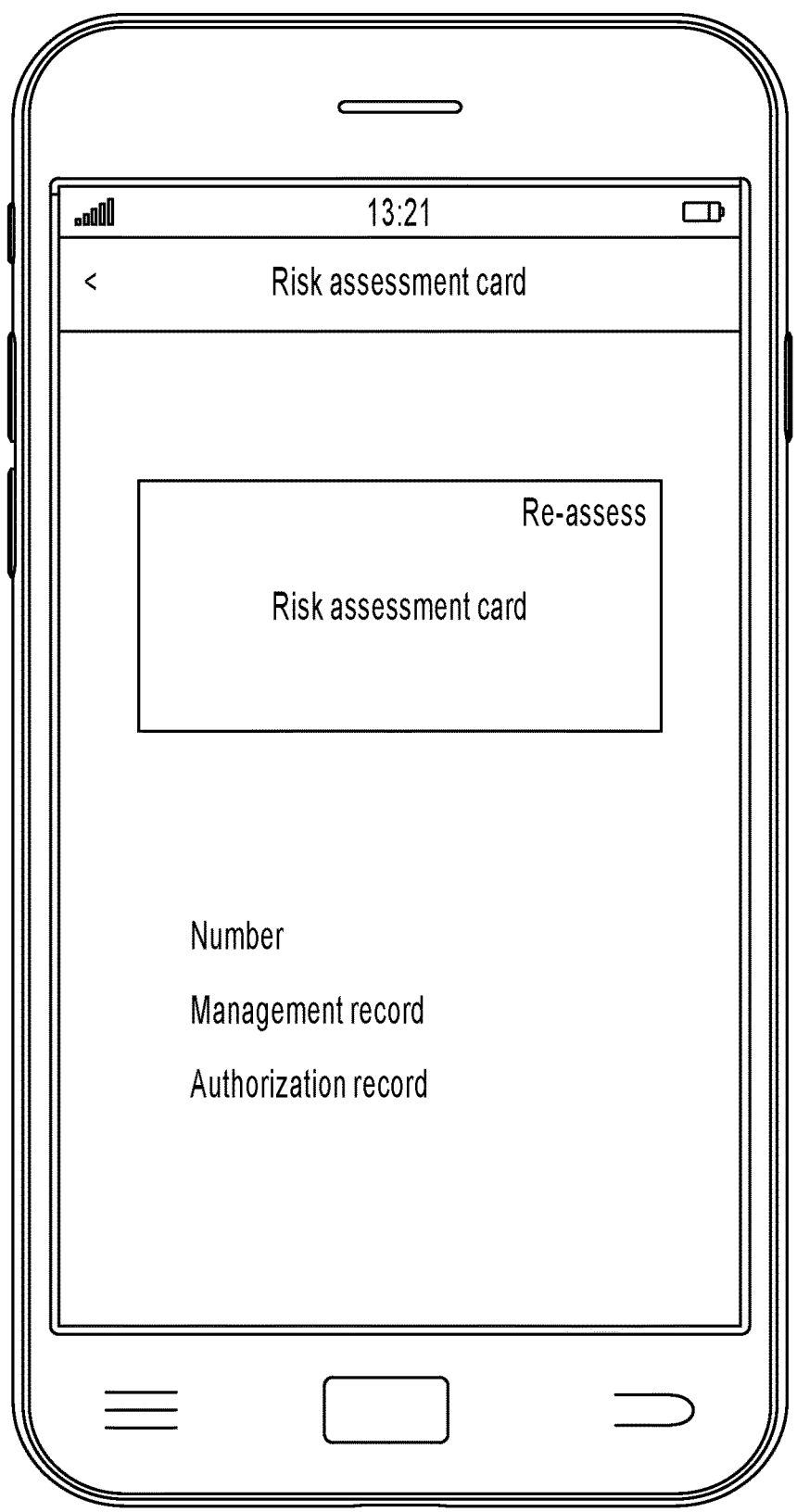
FIG. 3(*a*) is a schematic diagram 1 illustrating an interface for updating a risk assessment card in a blockchain-based service processing method, according to embodiments of the present specification.
Figure 3B:
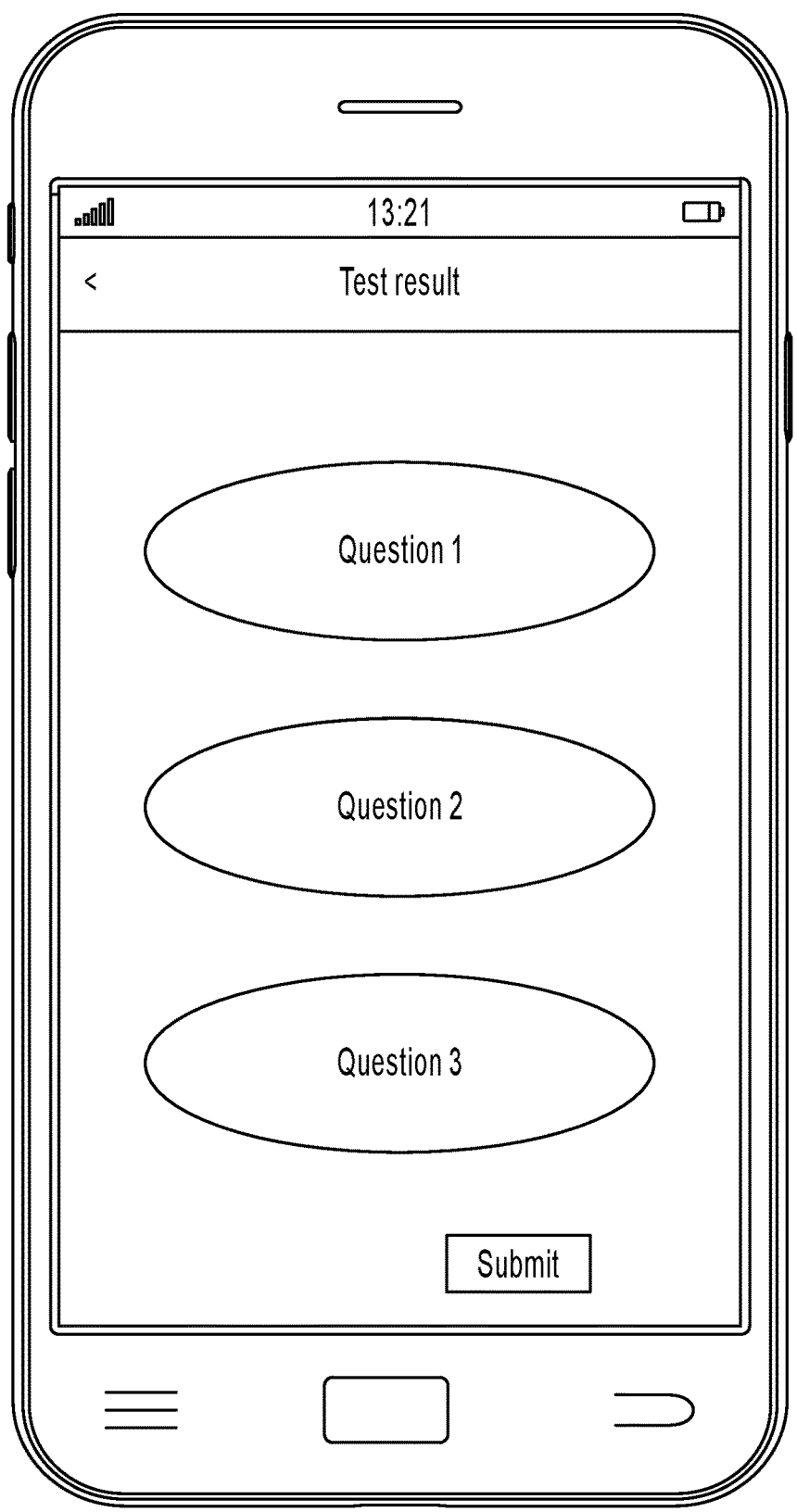
Figure 3C:
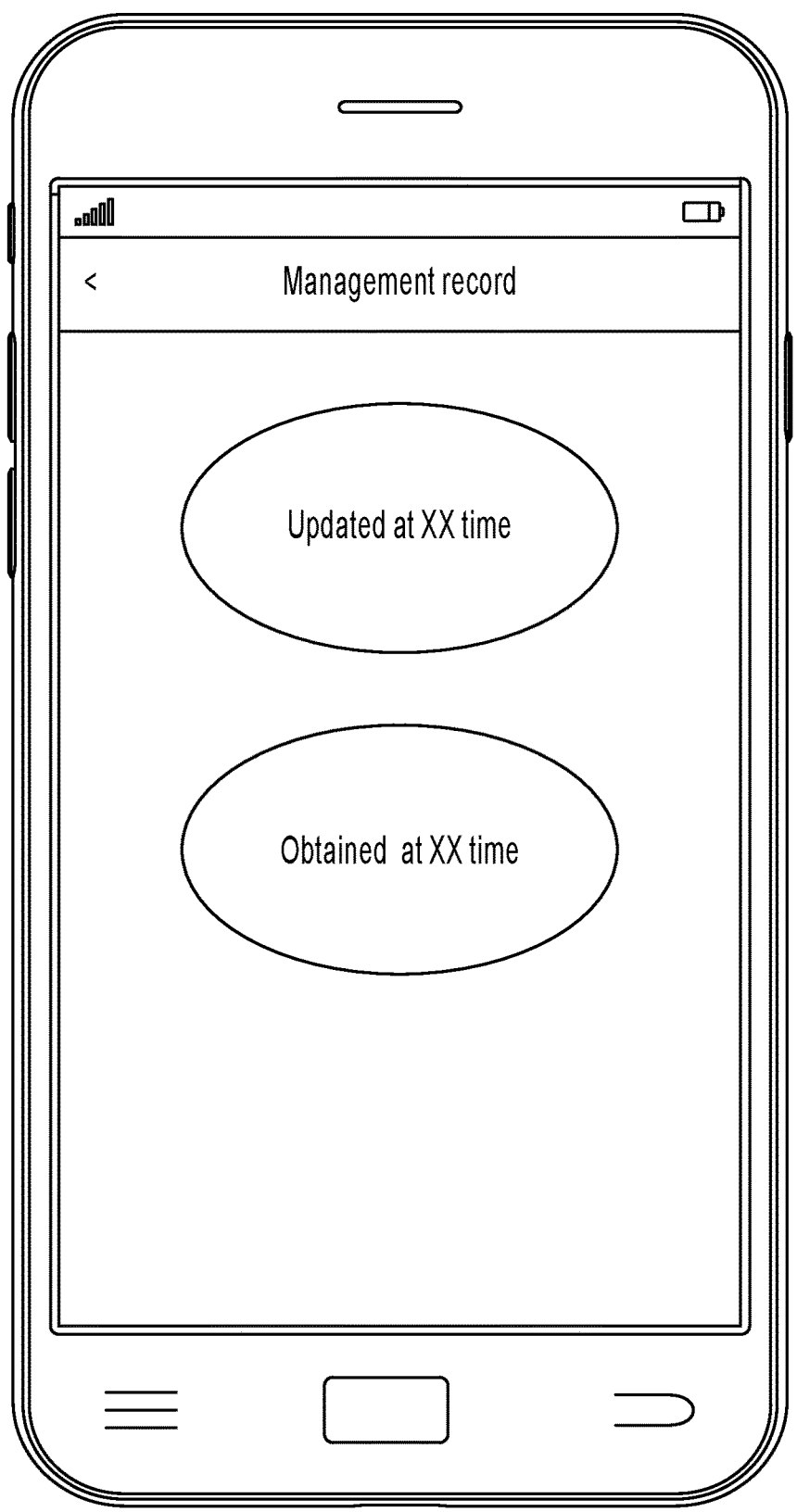

To facilitate understanding of the method provided in the embodiments of the present specification, the following describes the blockchain-based service processing method provided in the embodiments of the present specification with reference to interface diagrams. Specifically, when risk assessment needs to be repeated for a user, the user can tap "re-assess" on an interface shown in FIG. 3(a), to switch to a risk assessment interface, as shown in FIG. 3(b). Risk assessment questionnaire information that the user needs to fill in is displayed on the interface. After filling in the risk assessment questionnaire information, the user taps a button "submit." Number information of a finally returned new risk assessment card does not change, and an obtained risk assessment card interface is shown in FIG. 3(a). A "management record" in the interface shown in FIG. 3(a) records related information of obtaining the risk assessment card and updating the risk assessment card by the user, as shown in FIG. 3(c).

Figure 4:
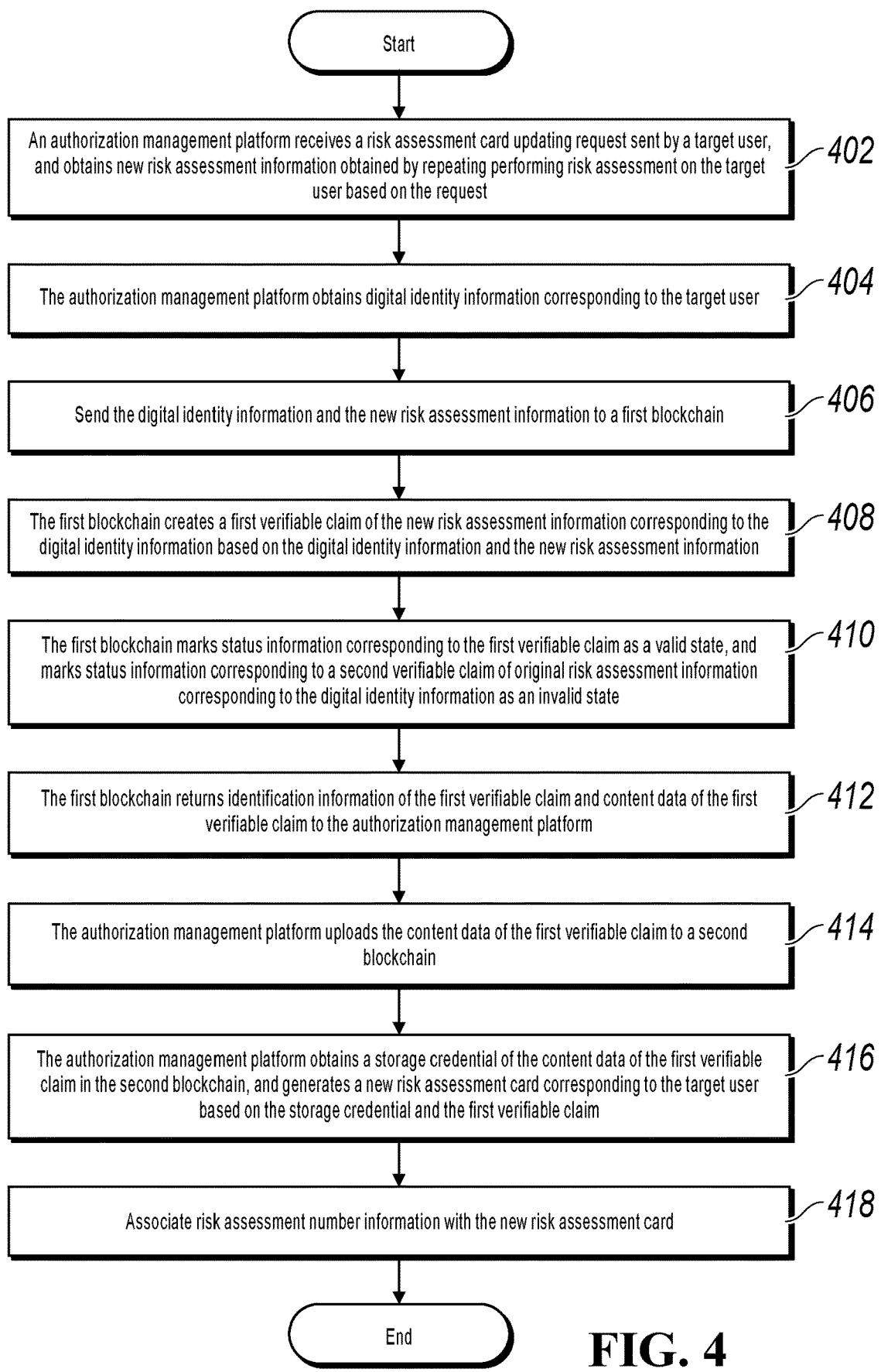
FIG. 4 is a second method flowchart illustrating a blockchain-based service processing method, according to embodiments of the present specification.

FIG. 4 is a second schematic flowchart illustrating a blockchain-based service processing method, according to embodiments of the present specification. As shown in FIG. 4, the method includes at least the following steps.

Step 402: An authorization management platform receives a risk assessment card updating request sent by a target user, and obtains new risk assessment information obtained by repeating performing risk assessment on the target user based on the request.

Step 404: The authorization management platform obtains digital identity information corresponding to the target user.

Step 406: Send the digital identity information and the new risk assessment information to a first blockchain.

Step 408: The first blockchain creates a first verifiable claim of the new risk assessment information corresponding to the digital identity information based on the digital identity information and the new risk assessment information.

Step 410: The first blockchain marks status information corresponding to the first verifiable claim as a valid state, and marks status information corresponding to a second verifiable claim of original risk assessment information corresponding to the digital identity information as an invalid state.

Step 412: The first blockchain returns identification information of the first verifiable claim and content data of the first verifiable claim to the authorization management platform.

Step 414: The authorization management platform uploads the content data of the first verifiable claim to a second blockchain.

Step 416: The authorization management platform obtains a storage credential of the content data of the first verifiable claim in the second blockchain, and generates a new risk assessment card corresponding to the target user based on the storage credential and the first verifiable claim.

Step 418: Associate risk assessment number information with the new risk assessment card.

The blockchain-based service processing method provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Figure 5:
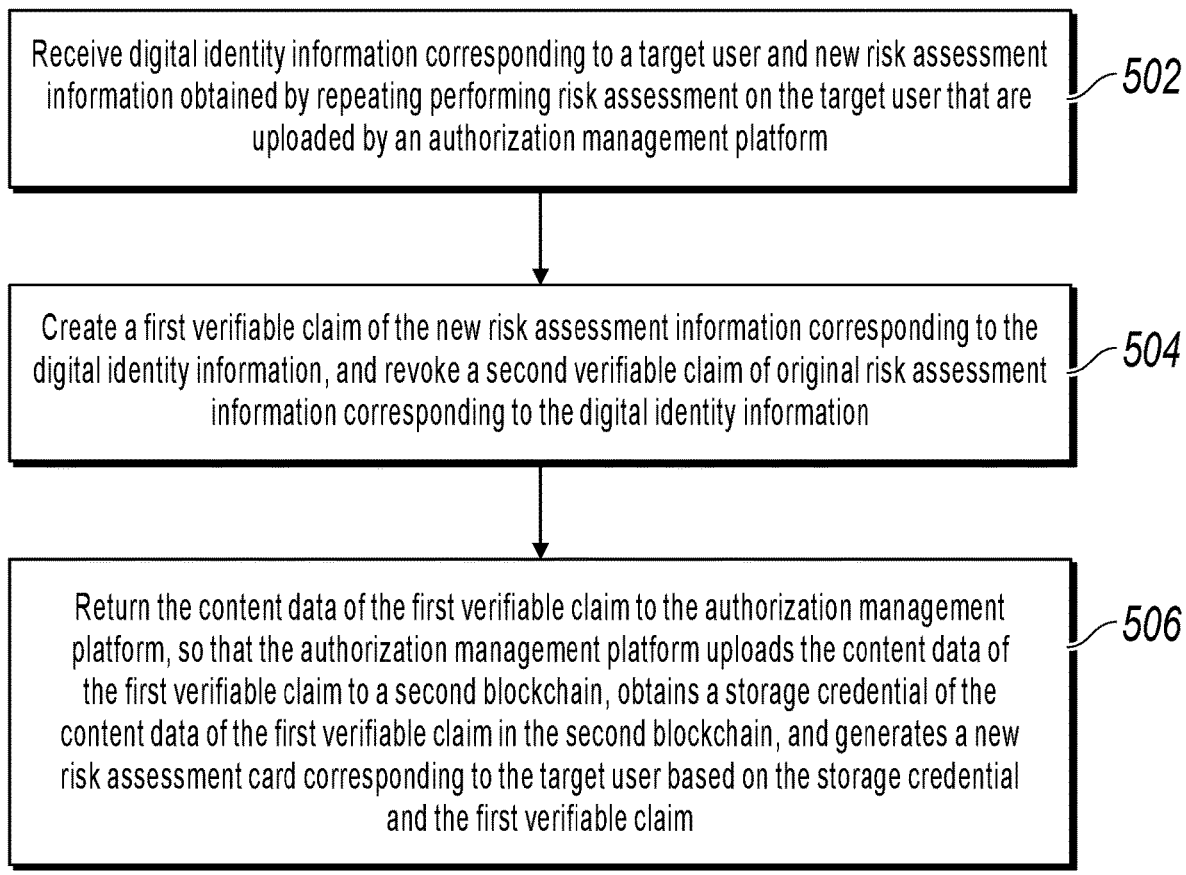
FIG. 5 is a third method flowchart illustrating a blockchain-based service processing method, according to embodiments of the present specification.

Corresponding to the methods provided in the embodiments shown in FIG. 2 to FIG. 4 in the present specification, based on the same idea, the embodiments of the present specification further provide a blockchain-based service processing method, applied to a first blockchain. FIG. 5 is a third method flowchart illustrating a blockchain-based service processing method, according to embodiments of the present specification. As shown in FIG. 5, the method includes at least the following steps.

Step 502: Receive digital identity information corresponding to a target user and new risk assessment information obtained by repeating performing risk assessment on the target user that are uploaded by an authorization management platform.

The new risk assessment information can be sent by a risk assessment center to the authorization management platform, or can be generated by directly performing risk assessment on the user on the authorization management platform.

Step 504: Create a first verifiable claim of the new risk assessment information corresponding to the digital identity information, and revoke a second verifiable claim of original risk assessment information corresponding to the digital identity information.

Content data of the first verifiable claim includes the new risk assessment information. Content data of the second verifiable claim includes the original risk assessment information.

Step 506: Return the content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim.

The second blockchain is connected to a service processing platform, and the new risk assessment card is used by the service processing platform to obtain the new risk assessment information of the target user from the second blockchain.

Optionally, the revoking a second verifiable claim of original risk assessment information corresponding to the digital identity information includes: modifying status information representing whether the content data of the second verifiable claim is valid to an invalid state, and marking status information representing whether the content data of the first verifiable claim is valid to a valid state.

Optionally, the content data of the first verifiable claim further includes at least one type of the following information: number information of the risk assessment information, the digital identity information of the target user, digital identity information of a risk assessment platform that repeats performing risk assessment, and generation time information of the new risk assessment information.

For specific implementation processes of the steps in the method provided in the embodiments of the present specification, references can be to the embodiments shown in FIG. 2 to FIG. 4. Details are omitted here for simplicity.

The blockchain-based service processing method provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Figure 6:
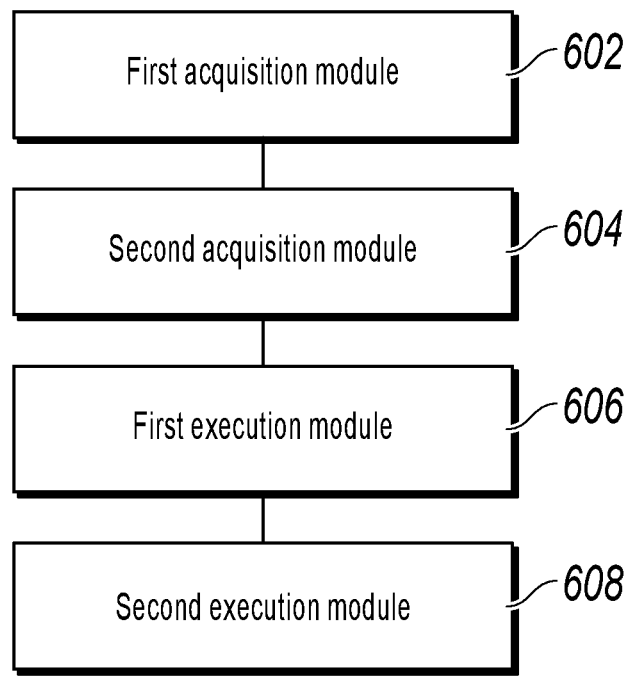
FIG. 6 is a first schematic module assembly diagram illustrating a blockchain-based service processing apparatus, according to embodiments of the present specification.

Corresponding to the methods provided in the embodiments shown in FIG. 2 to FIG. 4 in the present specification, based on the same idea, the embodiments of the present specification further provide a blockchain-based service processing apparatus, configured to perform the methods provided in the embodiments shown in FIG. 2 to FIG. 4 in the embodiments of the present specification. FIG. 6 is a schematic module assembly diagram illustrating a blockchain-based service processing apparatus, according to embodiments of the present specification. As shown in FIG. 6, the apparatus includes at least: a first acquisition module 602, configured to obtain new risk assessment information obtained by repeating performing risk assessment on a target user; a second acquisition module 604, configured to obtain digital identity information corresponding to the target user; a first execution module 606, configured to create a first verifiable claim of the new risk assessment information corresponding to the digital identity information based on the digital identity information and the new risk assessment information by using a first blockchain, and revoke a second verifiable claim of original risk assessment information corresponding to the digital identity information by using the first blockchain, where content data of the first verifiable claim includes the new risk assessment information, and content data of the second verifiable claim includes the original risk assessment information; and a second execution module 608, configured to upload the content data of the first verifiable claim to a second blockchain, obtain a storage credential of the content data of the first verifiable claim in the second blockchain, and generate a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The apparatus provided in the embodiments of the present specification can implement all the method steps in the embodiments shown in FIG. 2 to FIG. 4. Therefore, for specific implementation processes of functions corresponding to the apparatus, references can be made to the embodiments shown in FIG. 2 to FIG. 4. Details are omitted here for simplicity.

The blockchain-based service processing apparatus provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between an authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Figure 7:
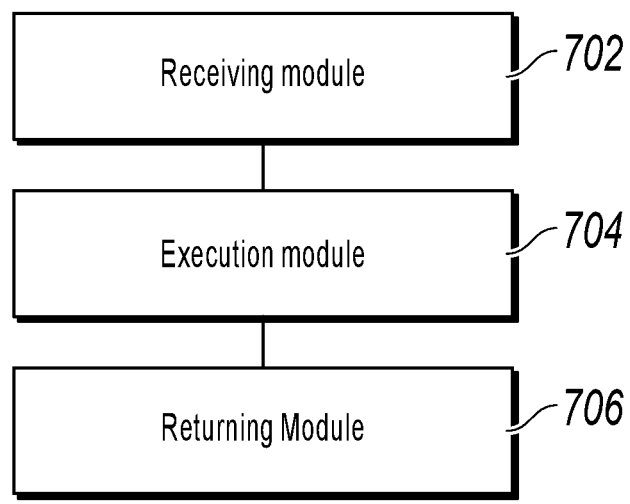
FIG. 7 is a second schematic module assembly diagram illustrating a blockchain-based service processing apparatus, according to embodiments of the present specification.

Corresponding to the method provided in the embodiments shown in FIG. 5 in the present specification, based on the same idea, the embodiments of the present specification further provide a blockchain-based service processing apparatus. The apparatus is applied to a first blockchain and is configured to perform the method provided in the embodiments shown in FIG. 5 in the embodiments of the present specification. FIG. 7 is a schematic module assembly diagram illustrating a blockchain-based service processing apparatus, according to embodiments of the present specification. As shown in FIG. 7, the apparatus includes at least: a receiving module 702, configured to receive digital identity information corresponding to a target user and new risk assessment information obtained by repeating performing risk assessment on the target user that are uploaded by an authorization management platform; an execution module 704, configured to create a first verifiable claim of the new risk assessment information corresponding to the digital identity information, and revoke a second verifiable claim of original risk assessment information corresponding to the digital identity information, where content data of the first verifiable claim includes the new risk assessment information, and content data of the second verifiable claim includes the original risk assessment information; and a returning module 706, configured to return the content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The apparatus provided in the embodiments of the present specification can implement all the method steps in the embodiments shown in FIG. 5. Therefore, for specific implementation processes of functions corresponding to the apparatus, references can be made to the embodiments shown in FIG. 5. Details are omitted here for simplicity.

The blockchain-based service processing apparatus provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Figure 8:
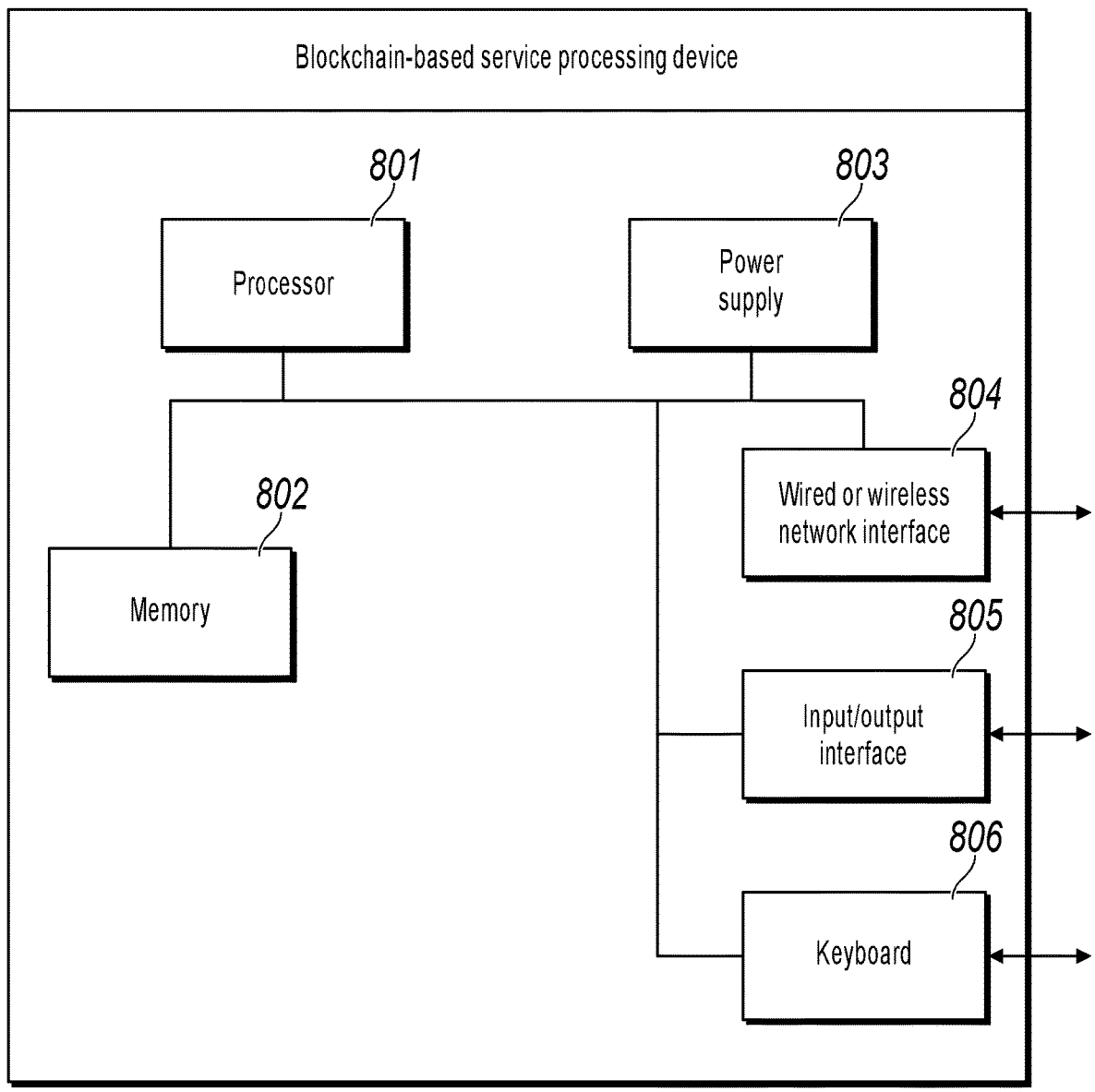
FIG. 8 is a schematic structural diagram illustrating a blockchain-based service processing device, according to embodiments of the present specification.

Further, based on the methods shown in FIG. 2 to FIG. 4, the embodiments of the present specification further provide a blockchain-based service processing device, as shown in FIG. 8.

The blockchain-based service processing device can greatly vary with configuration or performance, and can include one or more processors 801 and one or more memories 802. The memory 802 can store one or more storage applications or data. The memory 802 can be a temporary storage or a persistent storage. The application stored in the memory 802 can include one or more modules (not shown in the figure), and each module can include a series of computer-executable instruction information for the blockchain-based service processing device. Furthermore, the processor 801 can be configured to communicate with the memory 802, and execute a series of computer-executable instruction information in the memory 802 in the blockchain-based service processing device. The blockchain-based service processing device can further include one or more power supplies 803, one or more wired or wireless network interfaces 804, one or more input/output interfaces 805, one or more keyboards 806, etc.

In specific embodiments, the blockchain-based service processing device includes a memory and one or more programs. The one or more programs are stored in the memory. The one or more programs can include one or more modules. Each module can include a series of computer-executable instruction information for the blockchain-based service processing device. One or more processors are configured to execute the one or more programs, including the following computer-executable instruction information: obtaining new risk assessment information obtained by repeating performing risk assessment on a target user; obtaining digital identity information corresponding to the target user; creating a first verifiable claim of the new risk assessment information corresponding to the digital identity information based on the digital identity information and the new risk assessment information by using a first blockchain, and revoking a second verifiable claim of original risk assessment information corresponding to the digital identity information by using the first blockchain, where content data of the first verifiable claim includes the new risk assessment information, and content data of the second verifiable claim includes the original risk assessment information; and uploading the content data of the first verifiable claim to a second blockchain, obtaining a storage credential of the content data of the first verifiable claim in the second blockchain, and generating a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The device provided in the embodiments of the present specification can implement all the method steps in the embodiments shown in FIG. 2 to FIG. 4. Therefore, for specific implementation processes of functions corresponding to the device, references can be made to the embodiments shown in FIG. 2 to FIG. 4. Details are omitted here for simplicity.

The blockchain-based service processing device provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between an authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Further, based on the method shown in FIG. 5, the embodiments of the present specification further provide a blockchain-based service processing device, applied to a first blockchain. For a mechanism diagram of the device, references can be made to the device structure diagram shown in FIG. 8.

In specific embodiments, the blockchain-based service processing device includes a memory and one or more programs. The one or more programs are stored in the memory. The one or more programs can include one or more modules. Each module can include a series of computer-executable instruction information for the blockchain-based service processing device. One or more processors are configured to execute the one or more programs, including the following computer-executable instruction information: receiving digital identity information corresponding to a target user and new risk assessment information obtained by repeating performing risk assessment on the target user that are uploaded by an authorization management platform; creating a first verifiable claim of the new risk assessment information corresponding to the digital identity information, and revoking a second verifiable claim of original risk assessment information corresponding to the digital identity information, where content data of the first verifiable claim includes the new risk assessment information, and content data of the second verifiable claim includes the original risk assessment information; and returning the content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The device provided in the embodiments of the present specification can implement all the method steps in the embodiments shown in FIG. 5. Therefore, for specific implementation processes of functions corresponding to the device, references can be made to the embodiments shown in FIG. 5. Details are omitted here for simplicity.

The blockchain-based service processing device provided in the embodiments of the present specification has at least the following beneficial effects: After the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Further, based on the methods shown in FIG. 2 to FIG. 4, the embodiments of this application further provide a storage medium, configured to store computer-executable instruction information. In specific embodiments, the storage medium can be a USB flash drive, an optical disc, a hard disk, etc. The computer-executable instruction information stored in the storage medium can implement the following process when being executed by a processor: obtaining new risk assessment information obtained by repeating performing risk assessment on a target user; obtaining digital identity information corresponding to the target user; creating a first verifiable claim of the new risk assessment information corresponding to the digital identity information based on the digital identity information and the new risk assessment information by using a first blockchain, and revoking a second verifiable claim of original risk assessment information corresponding to the digital identity information by using the first blockchain, where content data of the first verifiable claim includes the new risk assessment information, and content data of the second verifiable claim includes the original risk assessment information; and uploading the content data of the first verifiable claim to a second blockchain, obtaining a storage credential of the content data of the first verifiable claim in the second blockchain, and generating a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The computer-executable instruction information stored in the storage medium provided in the embodiments of the present specification can implement all the method steps in the embodiments shown in FIG. 2 to FIG. 4 when being executed. Therefore, for specific implementation processes of functions corresponding to the computer-executable instruction information stored in the storage medium when the computer-executable instruction information stored in the storage medium is executed, references can be made to the embodiments shown in FIG. 2 to FIG. 4. Details are omitted here for simplicity.

The computer-executable instruction information stored in the storage medium provided in the embodiments of the present specification has at least the following beneficial effects when being executed: After the new risk assessment information is obtained by repeating performing risk assessment on the target user, the first verifiable claim used to claim the new risk assessment information is created based on the digital identity information of the target user and the new risk assessment information through cooperation between an authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Further, based on the method shown in FIG. 5, the embodiments of this application further provide a storage medium, configured to store computer-executable instruction information. In specific embodiments, the storage medium can be a USB flash drive, an optical disc, a hard disk, etc. The computer-executable instruction information stored in the storage medium can implement the following process when being executed by a processor: receiving digital identity information corresponding to a target user and new risk assessment information obtained by repeating performing risk assessment on the target user that are uploaded by an authorization management platform; creating a first verifiable claim of the new risk assessment information corresponding to the digital identity information, and revoking a second verifiable claim of original risk assessment information corresponding to the digital identity information, where content data of the first verifiable claim includes the new risk assessment information, and content data of the second verifiable claim includes the original risk assessment information; and returning the content data of the first verifiable claim to the authorization management platform, so that the authorization management platform uploads the content data of the first verifiable claim to a second blockchain, obtains a storage credential of the content data of the first verifiable claim in the second blockchain, and generates a new risk assessment card corresponding to the target user based on the storage credential and the first verifiable claim, where the second blockchain is connected to a service processing platform, and the new risk assessment card is used by the service processing platform to obtain the new risk assessment information of the target user from the second blockchain.

The computer-executable instruction information stored in the storage medium provided in the embodiments of the present specification can implement all the method steps in the embodiments shown in FIG. 5 when being executed. Therefore, for specific implementation processes of functions corresponding to the computer-executable instruction information stored in the storage medium when the computer-executable instruction information stored in the storage medium is executed, references can be made to the embodiments shown in FIG. 5. Details are omitted here for simplicity.

The computer-executable instruction information stored in the storage medium provided in the embodiments of the present specification has at least the following beneficial effects when being executed: After the new risk assessment information is obtained by repeating performing risk assessment on the target user, the first verifiable claim used to claim the new risk assessment information is created based on the digital identity information of the target user and the new risk assessment information through cooperation between the authorization management platform and the first blockchain, and the second verifiable claim of the original risk assessment information corresponding to the digital identity information is revoked by using the first blockchain, to invalidate the content data of the second verifiable claim, thereby enabling risk assessment information of the target user to point to the new risk assessment information. In addition, the content data of the first verifiable claim is uploaded to the second blockchain for storage, the storage credential of the content data of the first verifiable claim in the second blockchain is obtained, and the new risk assessment card corresponding to the new risk assessment information of the target user is generated based on the storage credential and the first verifiable claim. As such, when the risk assessment information is obtained based on the new risk assessment card, the new risk assessment information stored in the second blockchain is obtained, that is, the risk assessment information is updated.

Specific embodiments of the present specification are described above. Other embodiments fall within the scope of the appended claims. In some cases, the actions or steps described in the claims can be performed in an order different from the order in the embodiments and the desired results can still be achieved. In addition, the process depicted in the accompanying drawings does not necessarily need the shown particular order or sequence to achieve the desired results. In some implementations, multi-tasking processing and parallel processing are allowed or may be advantageous.

In the 1990s, whether a technical improvement is a hardware improvement (for example, an improvement of circuit structures, such as a diode, a transistor, or a switch) or a software improvement (an improvement on a method process) can be clearly distinguished. However, as technologies develop, current improvements of many method process can be considered as direct improvements of hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without needing a chip manufacturer to design and manufacture a dedicated integrated circuit chip. In addition, at present, instead of manually manufacturing an integrated circuit chip, this type of programming is mostly implemented by using "logic compiler (logic compiler)" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previously described HDLs and is programmed into an integrated circuit.

A controller can be implemented by using any appropriate method. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art should also know that, in addition to implementing the controller by using only the computer-readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller and configured to implement various functions can also be considered as a structure in the hardware component. Alternatively, the apparatus configured to implement various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into various units based on functions for separate description. Certainly, when the present application is implemented, functions of the units can be implemented in one or more pieces of software and/or hardware.

A person skilled in the art should understand that the embodiments of the present application can be provided as a method, a system, or a computer program product. Therefore, the present application can use hardware only embodiments, software only embodiments, or embodiments with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application is described with reference to the flowcharts and/or block diagrams of the method, the device (system), and the computer program product according to the embodiments of the present specification. It is worthwhile to understand that computer program instruction information can be used to implement each process and/or each block in the flowcharts and/or the block diagrams and a combination of a process and/or a block in the flowcharts and/or the block diagrams. The computer program instruction information can be provided for a general-purpose computer, a dedicated computer, an embedded processor, or a processor of another programmable data processing device to generate a machine, so that the instruction information executed by a computer or a processor of another programmable data processing device generates an apparatus for implementing a specific function in one or more processes in the flowcharts and/or in one or more blocks in the block diagrams.

Alternatively, the computer program instruction information can be stored in a computer-readable memory that can instruct a computer or another programmable data processing device to work in a specific way, so that the instruction information stored in the computer-readable memory generates an artifact that includes an instruction information apparatus. The instruction information apparatus implements a specified function in one or more processes in the flowcharts and/or in one or more blocks in the block diagrams.

Alternatively, the computer program instruction information can be loaded to a computer or another programmable data processing device, so that a series of operation steps are performed on the computer or another programmable device, thereby generating computer-implemented processing. Therefore, the instruction information executed on the computer or another programmable device provides steps for implementing a specific function in one or more processes in the flowcharts and/or in one or more blocks in the block diagrams.

In a typical configuration, a computing device includes one or more central processing units (CPUs), input/output interfaces, network interfaces, and memories.

The memory can include a non-persistent memory, a random access memory (RAM), a non-volatile memory, and/or other forms in computer-readable media, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be computer-readable instruction information, a data structure, a program module, or other data. An example of the computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device, or any other non-transmission medium. The computer storage medium can be configured to store information that can be accessed by a computing device. As defined in the present application, the computer-readable medium does not include computer-readable transitory media (transitory media) such as a modulated data signal and a carrier.

It is worthwhile to further note that, the terms "include" and "comprise," or any other variants thereof are intended to cover a non-exclusive inclusion, so that a process, method, product, or device that includes a list of elements not only includes those elements but also includes other elements not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present application can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application can be described in the general context of computer-executable instruction information executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In the distributed computing environments, the program module can be located in both local and remote computer storage media including storage devices.

The embodiments of the present specification are described in a progressive way. For same or similar parts of the embodiments, mutual references can be made to the embodiments. Each embodiment focuses on a difference from other embodiments. Particularly, a system embodiment is basically similar to a method embodiment, and therefore is described briefly. For related parts, references can be made to some descriptions in the method embodiment.

The previous descriptions are only embodiments of the present application, and are not intended to limit the present application. A person skilled in the art can make various modifications and changes to the present application. Any modification, equivalent replacement, improvement, etc. made without departing from the spirit and principle of the present application shall fall within the scope of the claims in the present application.

What is claimed is:

1. A computer-implemented method comprising:
obtaining risk assessment information by performing risk assessment on a user;
obtaining a digital identity of the user;
creating a first verifiable claim based on the digital identity and the risk assessment information of the user by using a first blockchain, wherein the first verifiable claim comprises the risk assessment information;
revoking a second verifiable claim of original risk assessment information corresponding to the digital identity by using the first blockchain, wherein the second verifiable claim comprises the original risk assessment information;
uploading the first verifiable claim to a second blockchain;
obtaining a storage credential of the first verifiable claim in the second blockchain, wherein the second blockchain is connected to a service processing platform;
generating a risk assessment card corresponding to the user based on the storage credential and the first verifiable claim; and
allowing the service processing platform to obtain the risk assessment information of the user from the second blockchain by using the risk assessment card.

2. The computer-implemented method according to claim 1, wherein revoking the second verifiable claim of the original risk assessment information corresponding to the digital identity by using the first blockchain comprises:
modifying status information of the second verifiable claim to be invalid and updating the status information of the first verifiable claim to be valid by using the first blockchain.

3. The computer-implemented method according to claim 1, wherein the risk assessment information comprises a risk assessment number identical to an original risk assessment number corresponding to the original risk assessment information; and
wherein the method further comprises, after generating the risk assessment card corresponding to the user based on the storage credential and the first verifiable claim, associating the risk assessment number with the risk assessment card.

4. The computer-implemented method according to claim 1, wherein creating the first verifiable claim based on the digital identity and the risk assessment information by using the first blockchain comprises:
sending the digital identity and the risk assessment information to the first blockchain; and
receiving identification information of the first verifiable claim and the first verifiable claim returned by the first blockchain.

5. The computer-implemented method according to claim 1, wherein creating the first verifiable claim based on the digital identity and the risk assessment information by using the first blockchain comprises:
creating the first verifiable claim based on the digital identity and the risk assessment information; and
writing identification information of the first verifiable claim to the first blockchain.

6. The computer-implemented method according to claim 1, wherein uploading the first verifiable claim to the second blockchain comprises:
obtaining a ciphertext corresponding to the first verifiable claim by encrypting the first verifiable claim based on a public key corresponding to the digital identity; and
uploading the ciphertext to the second blockchain.

7. The computer-implemented method according to claim 1, wherein obtaining the digital identity of the user comprises: searching pre-generated digital identities for the digital identity of the user, wherein the digital identity is created based on identification information of the user on a risk assessment platform or account information of the user at the risk assessment platform.

8. The computer-implemented method according to claim 1, wherein the first verifiable claim further comprises at least one of the following:

a risk assessment number, the digital identity of the user, a digital identity of a risk assessment platform, and time of generation of the risk assessment information.

9. The computer-implemented method according to claim 1, wherein obtaining the risk assessment information by performing risk assessment on the user comprises:
receiving a request for updating the risk assessment card from the user by using a client device; and
obtaining the risk assessment information by performing risk assessment on the user based on the request.

10. The computer-implemented method according to claim 1, wherein obtaining the risk assessment information by performing risk assessment on the user comprises:
receiving an update of the original risk assessment information of the user from a risk assessment platform, wherein the update comprises the risk assessment information obtained by performing risk assessment on the user.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining risk assessment information by performing risk assessment on a user;
obtaining a digital identity of the user;
creating a first verifiable claim based on the digital identity and the risk assessment information of the user by using a first blockchain, wherein the first verifiable claim comprises the risk assessment information;
revoking a second verifiable claim of original risk assessment information corresponding to the digital identity by using the first blockchain, wherein the second verifiable claim comprises the original risk assessment information;
uploading the first verifiable claim to a second blockchain;
obtaining a storage credential of the first verifiable claim in the second blockchain, wherein the second blockchain is connected to a service processing platform;
generating a risk assessment card corresponding to the user based on the storage credential and the first verifiable claim; and
allowing the service processing platform to obtain the risk assessment information of the user from the second blockchain by using the risk assessment card.

12. The computer-implemented system according to claim 11, wherein revoking the second verifiable claim of the original risk assessment information corresponding to the digital identity by using the first blockchain comprises:
modifying status information of the second verifiable claim to be invalid and updating the status information of the first verifiable claim to be valid by using the first blockchain.

13. The computer-implemented system according to claim 11, wherein the risk assessment information comprises a risk assessment number identical to an original risk assessment number corresponding to the original risk assessment information; and
wherein the operations further comprise, after generating the risk assessment card corresponding to the user based on the storage credential and the first verifiable claim, associating the risk assessment number with the risk assessment card.

14. The computer-implemented system according to claim 11, wherein creating the first verifiable claim based on the digital identity and the risk assessment information by using the first blockchain comprises:
sending the digital identity and the risk assessment information to the first blockchain; and
receiving identification information of the first verifiable claim and the first verifiable claim returned by the first blockchain.

15. The computer-implemented system according to claim 11, wherein creating the first verifiable claim based on the digital identity and the risk assessment information by using the first blockchain comprises:
creating the first verifiable claim based on the digital identity and the risk assessment information; and
writing identification information of the first verifiable claim to the first blockchain.

16. The computer-implemented system according to claim 11, wherein uploading the first verifiable claim to the second blockchain comprises:
obtaining a ciphertext corresponding to the first verifiable claim by encrypting the first verifiable claim based on a public key corresponding to the digital identity; and
uploading the ciphertext to the second blockchain.

17. The computer-implemented system according to claim 11, wherein obtaining the digital identity of the user comprises:
searching pre-generated digital identities for the digital identity of the user, wherein
the digital identity is created based on identification information of the user on a risk assessment platform or account information of the user at the risk assessment platform.

18. The computer-implemented system according to claim 11, wherein the first verifiable claim further comprises at least one of the following:
a risk assessment number, the digital identity of the user, a digital identity of a risk assessment platform, and time of generation of the risk assessment information.

19. The computer-implemented system according to claim 11, wherein obtaining the risk assessment information by performing risk assessment on the user comprises:
receiving a request for updating the risk assessment card from the user by using a client device; and
obtaining the risk assessment information by performing risk assessment on the user based on the request.

20. A non-transitory, computer-readable medium storing one or more instructions executable by a computer system to perform operations comprising:
obtaining risk assessment information by performing risk assessment on a user;
obtaining a digital identity of the user;
creating a first verifiable claim based on the digital identity and the risk assessment information of the user by using a first blockchain, wherein the first verifiable claim comprises the risk assessment information;
revoking a second verifiable claim of original risk assessment information corresponding to the digital identity by using the first blockchain, wherein the second verifiable claim comprises the original risk assessment information;
uploading the first verifiable claim to a second blockchain;
obtaining a storage credential of the first verifiable claim in the second blockchain, wherein the second blockchain is connected to a service processing platform;

generating a risk assessment card corresponding to the user based on the storage credential and the first verifiable claim; and allowing the service processing platform to obtain the risk assessment information of the user from the second blockchain by using the risk assessment card.

* * * * *